US008448317B2

(12) United States Patent  
Fra

(10) Patent No.: US 8,448,317 B2
(45) Date of Patent: May 28, 2013

(54) BRAKE ADJUSTERS

(75) Inventor: Giovanni Fra, Costanzana (IT)

(73) Assignee: Automotive Products Italia (SV) s.r.l. (IT)

( * ) Notice: Subject to any disclaimer, the term of this patent is extended or adjusted under 35 U.S.C. 154(b) by 541 days.

(21) Appl. No.: 12/808,018

(22) PCT Filed: Dec. 12, 2008

(86) PCT No.: PCT/IB2008/003702
§ 371 (c)(1),
(2), (4) Date: Jun. 14, 2010

(87) PCT Pub. No.: WO2009/077855
PCT Pub. Date: Jun. 25, 2009

(65) Prior Publication Data
US 2010/0299898 A1  Dec. 2, 2010

(30) Foreign Application Priority Data
Dec. 15, 2007  (GB) .................................... 0724493.2

(51) Int. Cl.
*B23P 6/00*  (2006.01)
(52) U.S. Cl.
USPC ........... 29/244; 29/270; 254/93 R; 248/354.3; 410/151
(58) Field of Classification Search
USPC .. 269/6, 3, 95; 29/270, 244, 253, 278; 254/93 R, 100, 95; 248/354.3; 410/151
See application file for complete search history.

(56) References Cited

U.S. PATENT DOCUMENTS

| | | | | | |
|---|---|---|---|---|---|
| 3,154,291 | A | * | 10/1964 | Salyer ............................ | 254/102 |
| 4,783,053 | A | * | 11/1988 | Yirmiyahu et al. .......... | 254/93 R |
| 4,914,940 | A | * | 4/1990 | Hebert ............................ | 72/392 |
| 5,810,333 | A | * | 9/1998 | Hickerson et al. ........... | 254/93 R |
| 6,101,702 | A | * | 8/2000 | Claycomb et al. ........... | 29/426.4 |
| 6,964,542 | B1 | * | 11/2005 | Sullivan ........................ | 405/272 |
| 7,374,380 | B2 | * | 5/2008 | Huang ........................... | 410/151 |
| 2010/0299898 | A1 | * | 12/2010 | Fra ................................. | 29/244 |

FOREIGN PATENT DOCUMENTS

| | | |
|---|---|---|
| EP | 388057 A1 | 9/1990 |
| GB | 2 444 942 A | 6/2008 |
| GB | 2447424 A | 9/2008 |
| JP | 2004-68859 | 3/2004 |
| WO | WO 03/025415 A1 | 3/2003 |

* cited by examiner

Primary Examiner — Lee D Wilson
(74) Attorney, Agent, or Firm — RatnerPrestia

(57) ABSTRACT

A brake adjuster for adjusting the working clearance of the shoes of an automotive drum brake. The adjuster has three co-axial elements, a first end element having a head portion for engagement with a first brake shoe and a threaded stem portion, an intermediate element in threaded engagement with the first end element, and a second end element having a head portion for engagement with a second brake shoe and a stem portion slideably connected with the intermediate element and free to rotate relative thereto. A reaction member is mounted on the intermediate element, and a toothed ring gear rotates with the intermediate element and is axially located between the second end element and the reaction member. A leaf spring acts between the second end element and the reaction member for pushing the second end element away from the intermediate element.

3 Claims, 2 Drawing Sheets

US 8,448,317 B2

BRAKE ADJUSTERS

CROSS REFERENCE TO RELATED APPLICATIONS

This application is the U.S. national phase application of PCT International Application No. PCT/IB2008/003702, filed Dec. 12, 2008, which claims priority to Great Britain Patent Application No. 07 24493.2, filed Dec. 15, 2007, the contents of such application being incorporated by reference herein.

FIELD OF THE INVENTION

This invention relates to brake adjusters, hereinafter referred to as of the kind described, for adjusting the working clearance of the shoes of an automotive drum brake, the adjuster including three co-axial elements:

a first end element having a head portion for engagement with a first brake shoe and a threaded stem portion;

an intermediate element in threaded engagement with the first end element;

a second end element having a head portion for engagement with a second brake shoe and a stem portion slideably connected with the intermediate element and free to rotate relative thereto;

a reaction member mounted on the intermediate element;

a toothed ring gear for rotation with the intermediate element and axially located between the second end element and the reaction member; and a leaf spring acting between the second end element and the reaction member for pushing the second end element away from the intermediate element, said leaf spring carrying a pawl designed to engage the teeth of the ring gear for rotation of the ring gear to adjust the effective length of the adjuster.

BACKGROUND OF THE INVENTION

An example of such a brake adjuster is disclosed in the Applicant's published International patent Application No. W003/025415 A1, which is incorporated by reference.

Whilst such brake adjusters are well known and are effective in use they have hitherto been relatively expensive to manufacture.

SUMMARY OF THE INVENTION

It is an object of the present invention to provide a form of brake adjuster of the kind described which is cheaper to manufacture.

Thus according to aspects of the present invention there is provided a brake adjuster of the kind described in which the reaction member has resilient formations which snap into a co-operating formation on the intermediate element to fix the reaction member axially relative to the intermediate element.

Such a construction provides economies of manufacture since the reaction member can be simply pushed onto the intermediate element whereupon the formations snap-on to the co-operating formation.

Preferably the reaction member is of sleeve-like form and has a pair of spring arms pressed out of the sleeve and provided with inwardly turned lugs at their free ends for engagement with the co-operating formation.

The co-operating formation may conveniently comprise an annular, groove formed in the intermediate element.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
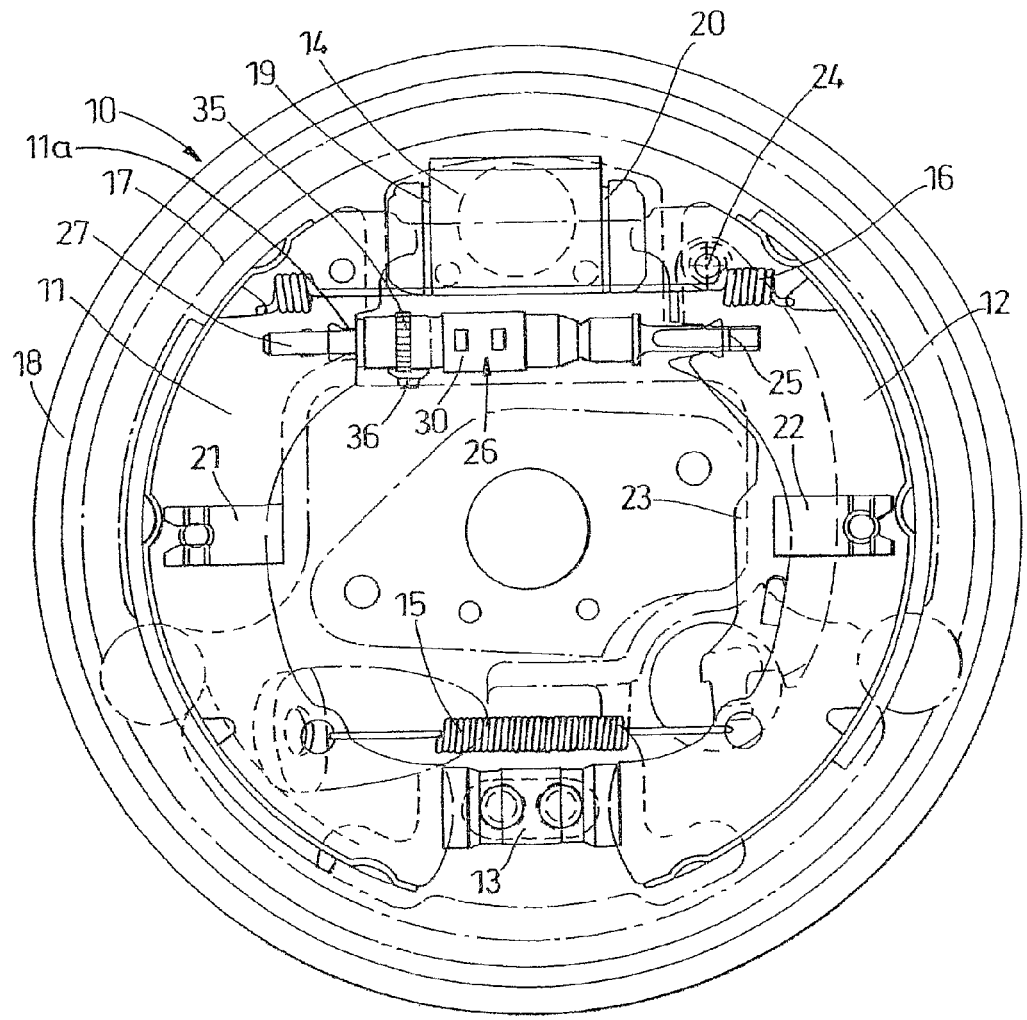
FIG. 1 is a side view of a vehicle drum brake including a brake adjuster embodying aspects of the present invention.
Figure 2:
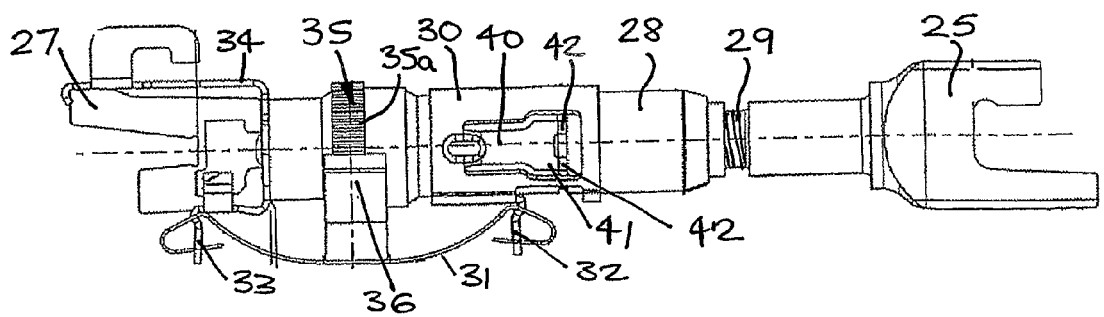
FIG. 2 is a side view of the brake adjuster used in FIG. 1.

Referring to FIG. 1, this shows a drum brake 10 having a pair of brake shoes 11,12 which at their lower ends react against a fixed abutment 13 and at their upper ends are forced apart by an hydraulic wheel cylinder 14. The shoes are kept in contact with the abutment 13 by a lower return spring 15 and in contact with the wheel cylinder 14 by an upper return spring 16.

Thus during normal service operation the shoes are brought into contact with the inner surface 17 of brake drum 18 in the conventional manner by actuating wheel cylinder 14 whose pistons 19 and 20 respectively outwardly displace the contacting ends of shoes 11 and 12 to engage the drum. In the conventional manner the two shoes are held down by hold down clips 21 and 22 respectively. The drum brake is also provided with a handbrake operating lever 23 pivoted at 24 on brake shoe 12. The hand brake operating lever contacts the right hand first head element 25 of an adjuster in the form of a strut 26 whose left hand second head element 27 contacts the other brake shoe 11. In conventional manner if, for example, the handbrake lever 23 is pivoted on pivot 24 in a clockwise sense as viewed in FIG. 1 the handbrake lever will push head element 25 of adjuster strut 26 to the left thus pushing the brake shoe 11 to the left. This in effect causes the two brake shoes 11 and 12 to move apart relative to each other and hence again engage the inner surface 17 of the brake drum 18 thus applying the hand brake.

The adjuster strut 26 basically comprises three components. A first head element 25, a second head element 27 and an intermediate element 28. The head element 25 has a threaded stem portion 29 which is received in a screw threaded bore in the right hand end of intermediate element 28. Similarly the second head element 27 has a stem portion which is axially slideable within an internal bore in the left hand end of intermediate element 28. A sheet metal reaction member 30 surrounds the intermediate element 28 and is axially located relative thereto as will be described below. A bow spring 31 reacts at one end on an abutment 32 provided on the reaction member 30 and at its other end on an abutment 33 provided on a clip like reaction member 34 mounted on the stem portion of left hand head portion 27. A ring gear 35 having teeth 35a is carried on intermediate element 28 is engaged by a pawl 36 which forms part of bow spring 31.

Bow spring 31 biases head element 27 to the left relative to the intermediate element 28. The effect of this is that when the head element 27 is moved into the bore in the intermediate member when the brake shoes are retracted by the springs 15 and 16 this causes the bow spring 31 to assume a more bowed configuration so that the pawl 36 tends to be drawn up out of engagement with the tooth 35a of ring gear 35 which is it is currently engaging. When the amount of movement of the left hand head portion relative to the right hand portion exceeds a predetermined level (indicating a predetermined amount of retraction of the brake shoes which in turn indicates a predetermined amount of wear) then the pawl will engage the next tooth on ring gear 35 and when the brake is next applied the energy stored in the bowed spring rotates the intermediate element 28 slightly relative to the head element 25 to increase the effective length of the adjuster strut 26 to take up the wear.

Figure 3:
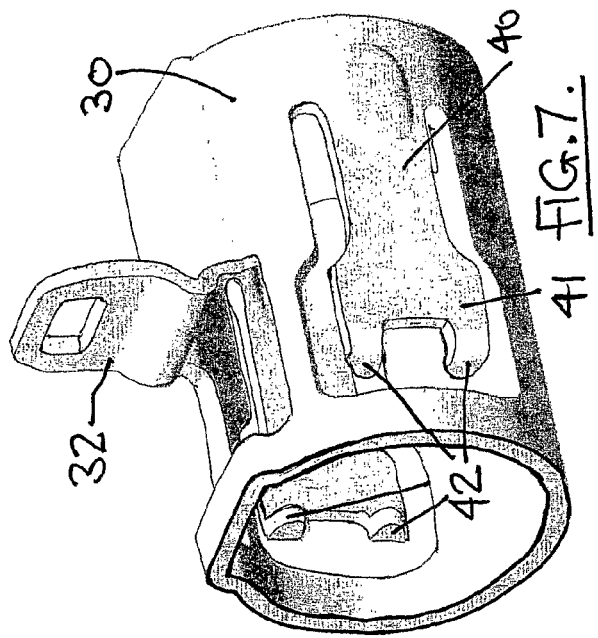
FIG. 3 is a perspective view of a spring and pawl used in the adjuster of FIG. 2.
Figure 7:
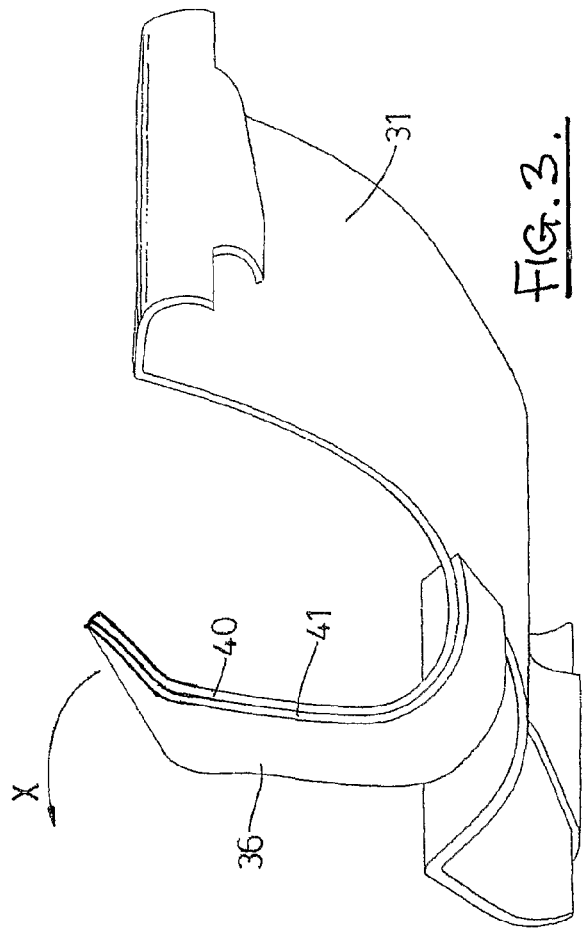
FIG. 7 shows a perspective view of the reaction member of FIGS. 4 and 5.
Figure 5:
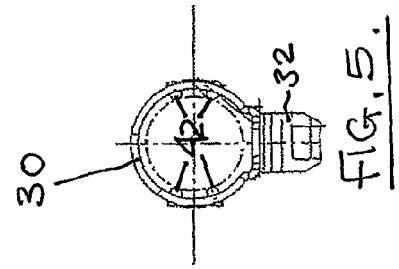
FIGS. 4 and 5 show sectional and end views respectively of a reaction member in accordance with aspects of the present invention.

In accordance with the Applicant's earlier PCT Application No. WO 03/025415 A1 a temperature sensitive mechanism is provided to ensure disengagement of the pawl 36 from the teeth 35a of ring gear 35 at high temperatures to prevent over adjustment of the drum brake. This feature is provided by forming the pawl 36 as a bi-metal element as shown in FIG. 3 in which the pawl comprises a first metal layer 40 which is the same metal as the remainder of the bow spring and a second metal layer 41 which extends only over the pawl element of the spring or, alternatively, by forming the pawl as described in the Applicant's earlier PCT Application No. WO 03/25415 A1. With this type of construction when the bow spring heats up as a result of the general hot condition of the brake the pawl will tend to deflect to the left as shown by arrow X thus tending to disengage the teeth 35a of ring gear 35 and prevent over adjustment of the adjuster strut.

The ring gear 35 may be integrally formed as part of intermediate element 28 or may be formed from plastics material and moulded onto the intermediate element 28 of adjuster 26 as described and claimed in the Applicant's co-pending UK Patent Application No. 06 25547.5, which is incorporated by reference.

Figure 4:
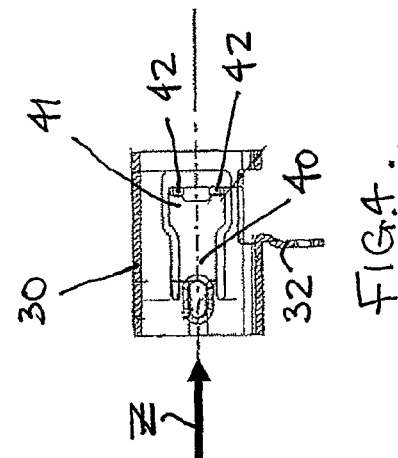
Figure 6:
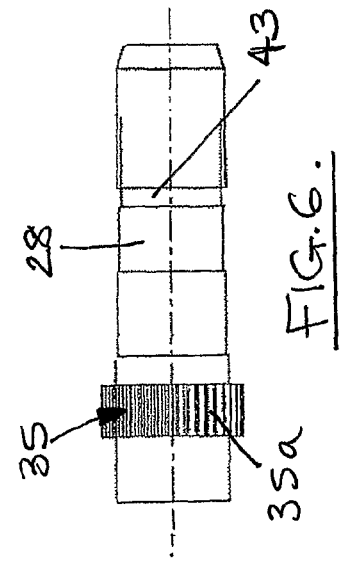
FIG. 6 shows a side view of an intermediate element used in the adjuster of FIG. 2.

In accordance with aspects of the present invention the reaction member 30 is of sleeve-like form and has integrally formed therein two resilient spring arms 40 whose free ends 41 have inwardly extending lugs 42 formed thereon. These lugs 42 are dimensioned to engage a circumferential groove 43 formed in the intermediate element 28 so that the reaction member 30 can be simply installed in position on intermediate element 28 by inserting element 28 through the reaction member as indicated by arrow Z in FIG. 4 until lugs 42 snap into groove 43 to axially locate reaction member 30 relative to intermediate element 28.

As will be appreciated the above reaction member construction is particularly cheap and simple to manufacture and in particular lends itself to automatic assembly since it does not involve the use of any separate components such as circlips etc. nor the forming of locating formations on the reaction member after it has been located in the required position on the intermediate element.

The invention claimed is:

1. A brake adjuster for adjusting a working clearance of shoes of an automotive drum brake, the adjuster comprising:
    three co-axial elements including: (i) a first end element having a head portion for engagement with a first brake shoe and a threaded stem portion, (ii) an intermediate element in threaded engagement with the first end element, and (iii) a second end element having a head portion for engagement with a second brake shoe and a stem portion slideably connected with the intermediate element and free to rotate relative thereto;
    a reaction member mounted on the intermediate element;
    a toothed ring gear for rotation with the intermediate element and axially located between the second end element and the reaction member; and
    a leaf spring acting between the second end element and the reaction member for pushing the second end element away from the intermediate element, said leaf spring carrying a pawl that is configured to engage teeth of the ring gear for rotation of the ring gear to adjust an effective length of the brake adjuster, the reaction member having resilient formations which snap into a co-operating formation on the intermediate element to fix the reaction member axially relative to the intermediate element.

2. An adjuster according to claim 1, wherein the reaction member is of sleeve-like form and has a pair of spring arms pressed out of the sleeve and provided with inwardly turned lugs at their free ends for engagement with a co-operating formation.

3. An adjuster according to claim 2, wherein the co-operating formation comprises an annular groove in the intermediate element.

* * * * *